Aug. 7, 1951 E. LEVINTHAL 2,562,927

ULTRA-HIGH FREQUENCY DISCHARGE TUBE

Filed Dec. 28, 1946

INVENTOR
ELLIOTT LEVINTHAL
BY Paul B. Hunter
ATTORNEY

Patented Aug. 7, 1951

2,562,927

UNITED STATES PATENT OFFICE 2,562,927

ULTRA HIGH FREQUENCY DISCHARGE TUBE

Elliott Levinthal, Stanford University, Calif., assignor to The Sperry Corporation, a corporation of Delaware Application December 28, 1946, Serial No. 718,938

13 Claims. (Cl. 250—13)

Figures 1, 2:
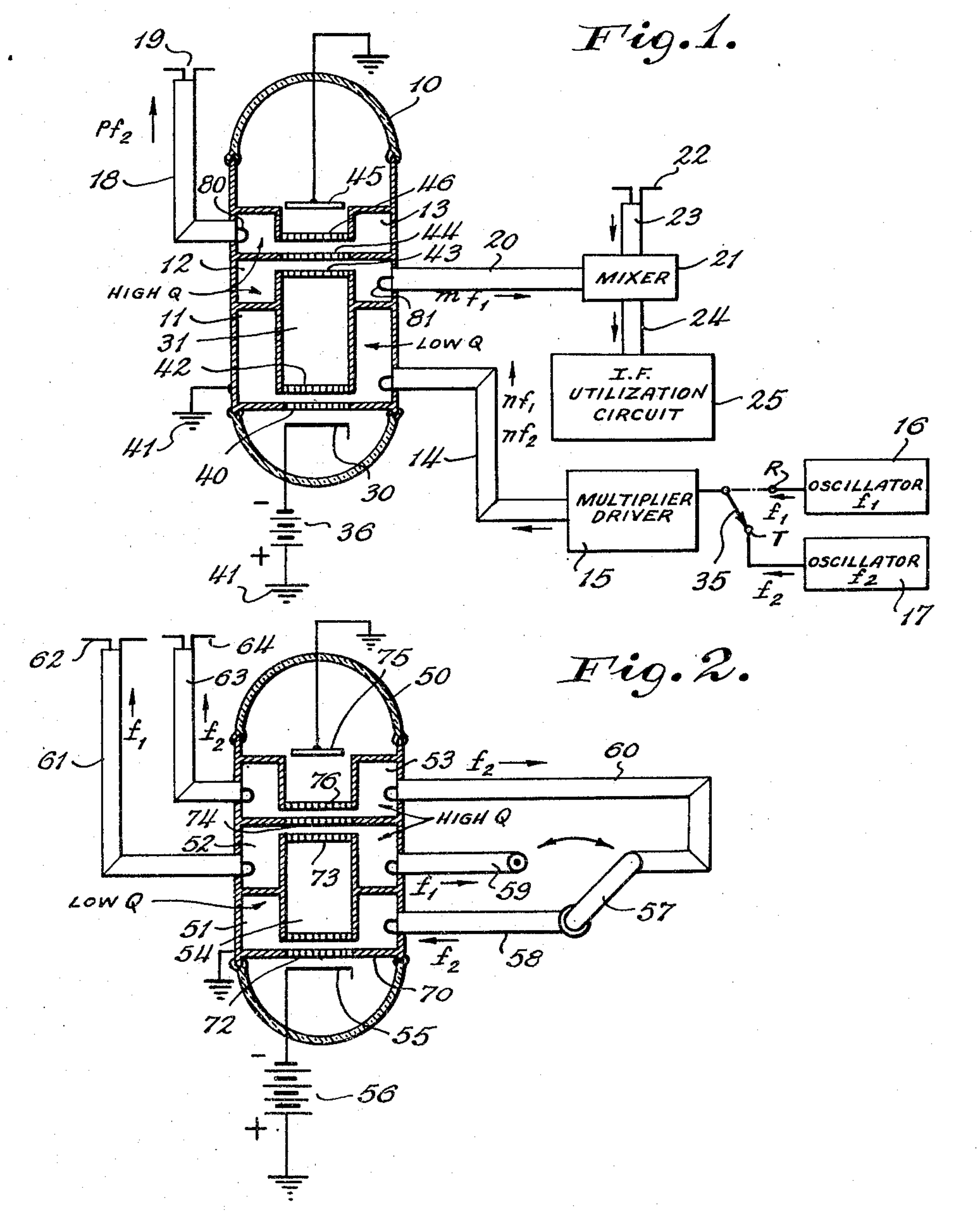

The present invention relates to unitary ultra- or super-high-frequency apparatus, operating between 100 megacycles per second and 30,000 megacycles per second, capable of multiplying the frequency of a plurality of frequency-stable energy inputs, and thus delivering a plurality of ultra-high-frequency energy outputs having the same percentage of frequency stability. It is further concerned with devices which are capable of operating as self-excited oscillators providing a plurality of ultra-high-frequency energy outputs.

In many microwave applications or systems, it is highly desirable to have available two or more sources of microwave energy. Such sources are generally provided in one of two ways, depending upon the amount of frequency stability required. If the required frequency stability is great, the method generally used consists of providing a crystal controlled oscillator stage, a driver-multiplier stage for frequency-multiplying the output energy of the crystal controlled oscillator stage, and a final or output stage which generally consists of a frequency multiplier tube operating on the velocity modulation principle. Such a multiplier tube usually has an input or buncher resonator which is driven or excited by the energy output of the driver multiplier stage, and an output or catcher resonator which provides the super-high-frequency energy. This output energy has a frequency which is a harmonic of the frequency of the energy used to excite the buncher resonator. Since the system, as a whole, operates as a multiplier, the frequency stability of the output signal is exactly the same, percentagewise, as that of the source of oscillations. If this source is crystal controlled, the frequency stability of the output signal is quite high, and is said to be a crystal controlled signal.

If the frequency stability requirements of the microwave application or system are less severe, a simpler method of supplying the ultra-high-frequency signals is generally adopted. This consists usually in operating a velocity-modulated cavity resonator type tube as a self-excited oscillator, the frequency of such an oscillator being determined by the resonant frequency of the resonant chamber from which the ultra- or super-high-frequency energy is removed.

It is to be noted that in both of the above methods of creating a plurality of microwave signals, a separate velocity-modulated tube is required for each microwave signal desired.

It is an object of the present invention to provide unitary ultra- or super-high-frequency apparatus capable of multiplying the frequency of a plurality of frequency-stable inputs, and delivering a like plurality of frequency-stable outputs.

It is a further object of the present invention to provide improved unitary ultra- or super-high-frequency apparatus capable of supplying a plurality of energy outputs having different frequencies.

Another object of the present invention is to provide an improved ultra- or super-high-frequency discharge tube capable of acting as a self-excited oscillator having a plurality of output frequencies.

A still further object of the present invention is to provide an improved ultra-or super-high-frequency discharge tube capable of multiplying a plurality of input frequencies.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Another object of the present invention is to provide improved ultra- or super-high-frequency apparatus capable of supplying a plurality of outputs, the frequencies of which need have no harmonic relationship.

Briefly, the invention consists of a velocity-modulated type multiplier tube having a single buncher resonator and a plurality of catcher resonators all being positioned in alignment. The catcher resonators are of the conventional sharply-tuned or high-Q types with their resonant frequencies equal to the desired output microwave signals. The buncher resonator, however, is of much lower Q than the catcher resonator. By making its Q sufficiently low, that is, by making the buncher resonator broadly tuned in contradistinction to the sharply-tuned catcher resonator, it cannot be said to have a single sharply-defined resonant frequency. Instead, the low-Q buncher resonator may be said to be resonant to a band of frequencies.

From the above it can easily be seen that if provision is made for a plurality of frequency-stable input signals to the buncher resonator, it is possible from a single tube to get a plurality of microwave outputs having the same degree of frequency stability. It is necessary, of course, that the frequency of each of the input signals shall fall within the acceptance band of the low-Q buncher resonator, so that it may be properly excited, and that each of the plurality of output catcher resonators be tuned to a harmonic of a different input signal. Thus for each input signal supplied to the buncher resonator there is a corresponding output resonator tuned to a desired harmonic of the input signal. It is obviously unnecessary that the catcher resonators be tuned to the same multiple of the frequencies of the various input signals, nor is there necessarily any harmonic relationship between the frequencies of the input signals themselves. All that is required is that the frequencies of all of the input signals be within the band of the buncher resonator and that for each input signal there shall be a catcher tuned to some harmonic thereof.

Since the tube in operation acts as an amplifier, the frequency stability of the output signal is the same as the frequency stability of the various signals supplied to the buncher resonator. If these input signals are crystal controlled, the microwave outputs of the catcher resonators may be said to be crystal controlled.

If the system or application can tolerate microwave signals having less frequency stability, the invention may be applied to a self-excited oscillator system. As before, a velocity-modulated tube is employed using a plurality of sharply-tuned catcher resonators and a single broadly tuned buncher resonator. Instead of exciting the buncher resonator from a separate source of oscillation, provision is made for selectively feeding a small fraction of the mricrowave energy from each of the catcher resonators to the buncher resonator. If the tube is to oscillate, it is necessary, of course, that the resonant frequency of each output resonator which is coupled to the buncher resonator shall fall within the band of the buncher resonator. Otherwise, the energy fed back will not excite the buncher resonator and oscillations will not be sustained. However, it can be seen that if the Q of the buncher is sufficiently low, that is, if the buncher is resonant to a wide band of frequencies, it is possible to provide a self-excited oscillator having a plurality of different frequency outputs in the microwave range.

The achievement of these and other objects by the present invention will become more apparent from the following descriptions, taken in connection with the accompanying drawing wherein:

Fig. 1 is a schematic wiring diagram of an embodiment of the present invention used as a multiplier device, and Fig. 2 is a schematic wiring diagram of a further embodiment of the present invention used as a self-excited oscillator.

Referring directly to Fig. 1, which presents an embodiment of the present invention as used in a microwave communication station, a thermionic tube 10 is shown which serves to multiply the frequency of a plurality of input signals in accordance with the present invention. Tube 10 has a thermionic cathode or electron source 30 and an electron-permeable accelerating electrode or grid 40, between which is connected an accelerating battery 36, with its negative terminal connected to the cathode 30. The positive terminal of the accelerating battery 36 is connected to a point 41 having ground potential as is the metallic envelope of tube 10 and accelerating electrode 40. Under the influence of the electric field thus produced between cathode 30 and grid 40, the electrons emitted from the cathode 30 are caused to travel therefrom in the form of a stream along a substantially straight line.

The electron stream, after passing through the electron-permeable accelerating electrode 40, continues along a substantially straight path and passes through three cavity resonators 11, 12 and 13 arranged in alignment with their common axis positioned in the electron stream. The accelerating electrode 40 forms the central portion of the end wall of buncher resonator 11 facing cathode 30. To permit the free passage of the electron stream through the opposite wall of this buncher resonator 11 and the end walls of catcher resonators 12 and 13, similar electron-permeable central areas or grids 42, 43, 44 and 46 are provided.

The cavity resonators 11, 12 and 13 depart from true cylindrical figures by having reentrant cylindrical portions along the axis. This permits closer spacing of grids 40 and 42 of buncher resonator 11, and grids 43, 44 and 46 of catcher resonators 12 and 13, grid 44 being common to both resonators 12 and 13. The electron stream, after passing through the final grid 46, impinges upon an anode or electron-collecting electrode 45 which is connected to ground.

External to tube 10 is shown a coupling line 18 connected to cavity resonator 13 by means of a suitable loop 80, and terminated by a radiating antenna 19. Cavity resonator 12 is connected to a conventional mixer unit 21 by means of a coupling line 20, a suitable loop 81 being provided for coupling line 20 to the resonator 12. The mixer unit 21 is also connected to a receiving or pickup antenna 22 by means of a coupling line 23. An intermediate frequency utilization circuit 25, of any conventional type, is connected to mixer 21 by a coupling line 24.

A pair of oscillators 16 and 17 are connected through a switch 35 to a multiplier driver unit 15 which is coupled to cavity resonator 13 through a coupling line 14.

In operation, switch 35 is used to change the communication station from a transmitting system to a receiving system, the multiplier tube 10 being used as a source of microwave energy in both operations; that is, tube 10 acts as both a source of transmitted energy and local oscillator energy for superheterodyne reception. If switch 35 is thrown to T (transmitting) position, the output signal of oscillator 17 whose frequency is $f_2$ is fed to multiplier-driver 15. Here, the frequency of this signal is multiplied $n$ times so that the output signal of driver 15 has a frequency of $nf_2$. This latter output signal is then fed to the buncher resonator 11 of multiplier tube 10 by coupling line 14.

The buncher, or input resonator 11, is so constructed that it is broad-band; that is, it can be efficiently excited by any input signal within a given band of frequencies. This broad-banding of the buncher resonator may be achieved in any one of several ways. For example, the inner walls of the buncher resonator may be plated with a conductor having high resistivity. In such a case, the value of Q will drop, its magnitude being inversely proportional to the square root of the resistivity of the material making up the conducting wall. Another way of lowering the Q of the buncher resonator is by changing its size and shape. The ratio of volume to surface area determines Q, so that, in general, a shape which provides a decreased ratio of volume to surface area decreases the Q. Also, a sharp reentrant point in a resonator may increase the current concentration tremendously and lower the value of Q considerably. No specific method is required to achieve the purpose of the present invention; all that is necessary is that the buncher resonator have a value of Q that is appreciably lower than that of the catcher resonators.

The frequency $nf_2$ of the output signal from driver 15 is selected so as to fall within the band of frequencies which will excite buncher resonator 11 into oscillation. The oscillations created within buncher resonator 11 cause an alternating field of the same frequency to appear between grids 40 and 42, and thereby velocity modulate the electron stream as it passes through these grids. The velocity-modulated electron stream then passes through a drift tube 31 free from alternating fields, where, in accordance with conventional velocity modulation theory, the electrons in the stream become grouped or bunched This bunched stream has the ability to coact with a cavity resonator through which it later passes, providing such a cavity resonator is tuned to the velocity-modulating frequency or one of its harmonics.

Catcher resonator 13 is tuned to a frequency $pf_2$, which is a harmonic of the frequency $nf_2$ of the alternating field existing between grids 42 and 40, so that an alternating field of frequency $pf_2$ will be induced in catcher resonator 13 by the velocity-modulated and bunched beam as it passes through the gap between grids 44 and 46.

Coupling line 18 transfers the energy of the excited oscillating field in resonator 13 of frequency $pf_2$ to the antenna 19 where it is radiated. For purposes of simplification, the means for modulating this radiated ultra-high-frequency energy have been omitted, but any conventional method of modulation may be employed. One method consists in varying the amplitude of the output of driver 15 in accordance with the intelligence it is desired to transmit. This will cause the energy radiated by antenna 19 to be amplitude-modulated. Frequency modulation by well-known means may also be used.

By throwing the switch 35 to position R, the station operates as a receiving system. In this case, the output signal of oscillator 16, whose frequency is $f_1$, is fed to multiplier-driver unit 15, and the output of this unit, having a frequency $nf_1$, is fed by coupling line 14 to buncher resonator 11. As in the previous case, it is necessary for the input signal frequency $nf_1$ to fall within the band of frequencies which will excite resonator 11. The oscillations which are excited within resonator 11 cause an alternating voltage of frequency $nf_1$ to appear across the grids 40 and 42, which will velocity modulate the electron stream as it passes through the space between these grids. The electron stream becomes bunched or grouped as it passes through field-free drift space 31. As before, this bunched electron stream has the ability to coact with a cavity resonator through which it later passes, providing such a cavity resonator is tuned to the velocity-modulating frequency or one of its harmonics.

Resonator 12 has a resonant frequency of $mf_1$, which is a harmonic of the modulating frequency $nf_1$, so that an alternating field of frequency $mf_1$ will be induced in resonator 12 by the velocity-modulated and bunched beam as it passes across the gap between grids 43 and 44.

Coupling line 20 is used to transfer the energy of the excited oscillating field in resonator 12 to the mixer 21 of the receiver system. The receiver in this embodiment operates upon the superheterodyne principle, with multiplier tube 10 acting as the local oscillator. Antenna 22 serves to pick up the desired received signals and these are fed to mixer 21 by coupling line 23. Mixer 21 produces an intermediate-frequency signal which is, in most systems, an alternating signal whose frequency is the difference between the frequencies of the received signal and the local oscillator signal. The output of mixer 21 is fed to the intermediate frequency utilization circuit 25 by coupling line 24.

Thus, by means of switch 35, the communication station can be changed from a transmitting system to a receiving system. When the station operates as a transmitter, multiplier tube 10 serves to supply the microwave signals which are fed to the transmitting antenna 19 to be there radiated. When the station is used as a receiving system, the multiplier tube 10 operates to supply a microwave signal, which is used as the local oscillator signal for the superheterodyne receiver. It is readily seen that by the present invention, a single tube is used to produce both a signal for radiation purposes and a signal for local oscillator purposes. These two signals need have no particular harmonic relationship. Their frequency stability is the same, percentagewise, as that of the oscillators used to provide the input signals to the multiplier tube.

The communication station shown in Fig. 1 requires two frequency-stable microwave signals. For this reason, multiplier tube 10 has been shown as having two catcher resonators. For systems requiring a greater number of frequency-stable microwave signals, it is only necessary to provide additional catcher resonators each sharply tuned to the frequency of a desired signal, and respective oscillators capable of exciting the buncher resonator at subharmonics of these desired signal frequencies.

As exemplary of the magnitude of values encountered in a device constructed in accordance with the present invention, the following figures are given as illustrative. The buncher resonator may have a resonance curve centered at 270 megacycles per second, and with a relatively low value of Q such as in the neighborhood of 200 or less. The Q of a cavity resonator has the same significance as for an ordinary resonant circuit and could be defined as a quantity equal to the ratio of the resonant frequency of the circuit or resonator to twice the frequency deviation required to decrease the circuit response to 70.7 percent (3 decibels in power) of its response at the resonant frequency. This would mean, using the above definition and the values given, that for all input signals .675 megacycles per second, or less, either side of the buncher resonator frequency of 270 megacycles per second, the response will be no less than 70.7 percent of the response at 270 megacycles per second; that it, the band-width between the half power points is 1.35 megacycles per second. Of course, the buncher resonator would be excited by input signals whose frequency deviation from 270 megacycles per second is greater than .675 megacycles per second, but the input power requirements are so increased that the 3 decibel or half power point is considered to be a reasonable operating limit.

The tube used as a frequency multiplier may have a multiplying factor of 20. This would make the center frequency of the output range equal to twenty times the center frequency of the buncher resonator response curve or 5400 megacycles per second. The output band-width or range of possible frequencies existing at the output frequency would be twenty times 1.35 megacycles per second or 27 megacycles per second.

It is necessary of course, that each of the catcher resonators shall have its natural resonant frequency in the range of the output band-width if it is to be excited by the velocity-modulated electron stream. The catcher resonator should preferably be of high Q. One reason for this is to increase the efficiency of the tube. Secondly, if the catcher resonators have a sufficiently high Q only one of them is excited at a time even if the resonant frequencies of several others are quite close to that of the resonator which it is desired to excite. For example, if the Q of the catcher resonator is 2000, at 5400 megacycles per second the band-width of such a resonator between the half-power down points is 2.7 megacycles per second. Although this is greater in absolute value than band-width of the buncher resonator (1.35 megacycles per second), when the operating frequency is considered the circuit is ten times more selective. This greater selectivity permits the catcher resonators to have their natural resonant frequencies quite close to each other without any danger of exciting other than the single desired catcher resonator by the velocity modulated electron stream. Of course adjacent-tuned resonators will be excited to a certain degree, but if the selectivity is sufficiently high, the amplitude of oscillations excited in these adjacent tuned resonators will be low and in general will not interfere with the operation of the system. By separating the natural resonant frequencies of the resonators or increasing the catcher resonator Q this effect is made more pronounced.

Fig. 2 shows a further embodiment of the principles of the present invention in which microwave signals are supplied without requiring the use of separate oscillators for exciting the buncher chamber.

This embodiment shows a thermionic tube 50 connected to operate as a self-excited oscillator. A battery 56, whose negative terminal is connected to a thermionic cathode 55 and whose positive terminal is grounded, supplies an electrostatic field between the cathode 55 and an electron-permeable accelerating electrode or grid 70, which is also maintained at ground potential. This electrostatic field causes electrons which are emitted by the cathode 55 to travel toward grid 70 in substantially straight lines. Because of the electron-permeable characteristics of this grid 70, the electron stream passes through it and continues along its straight line path. Cavity resonators 51, 52 and 53 are positioned in alignment with their common axis in the line of the electron stream. The grid 70 forms the central portion of the end wall of buncher cavity resonator 51 facing cathode 55. To permit the free passage of the electron stream through the opposite end wall of buncher resonator 51 and through the central portions of the end walls of catcher resonators 52 and 53, similar electron-permeable central areas or grids 72, 73, 74 and 76 are provided.

As in multiplier tube 10, the resonators making up tube 50 depart from true cylindrical shape by having reentrant cylindrical portions along their axis. This permits closer spacing of grids 70 and 72 of buncher resonator 51 and of grids 73, 74, and 76 of catcher resonators 52 and 53, grid 74 being common to resonators 52 and 53. Between grids 72 and 73, there is a field-free space 54, which is formed by the cylindrical reentrant portions of catcher resonators 51 and 52. An anode electrode 75 is provided to collect the electrons of the stream after they pass through grid 76 which is farthest removed from cathode 75.

External to tube 50, a coupling line 60 connects catcher resonator 53 to one terminal of a switch 57, and a similar coupling line 59 connects catcher resonator 52 to another terminal of switch 57. Buncher resonator 51 is connected to the movable arm of switch 57 by a coupling line 58. An antenna 62 is coupled by a line 61 to catcher resonator 52 and a similar antenna 64 is coupled to catcher resonator 53 by a coupling line 63.

Buncher resonator 51 is used to velocity-modulate the electron stream as it passes therethrough. As in the multiplier tube 10, the buncher resonator 51 is so constructed so as to be broad-band; that is, it can be easily excited by any input signal within a given band of frequencies. The catcher resonators 52 and 53 are of the conventional sharply tuned type, being tuned to the frequencies of the desired microwave signals.

Catcher resonator 52 has a natural resonant frequency $f_1$ while catcher resonator 53 has a natural resonant frequency $f_2$. Frequencies $f_1$ and $f_2$ need have no particular relationship, but it is necessary that both of these frequencies shall fall within the band of frequencies which can excite the buncher resonator 51. A portion of the energy of a selected one of the catcher resonators 52 and 53, as determined by the position of switch 57 is fed back to the buncher resonator 51 by means of the coupling or feed-back lines 59 and 60.

If switch 57 is positioned to connect coupling line 60 to coupling line 58, a small fraction of the energy of the oscillating field in catcher resonator 53 will be fed back to buncher resonator 51. If the energy which is fed from catcher resonator 53 is of sufficient magnitude to set up oscillations in buncher resonator 51, the system will be maintained in oscillation. At a frequency near $f_2$ the frequency of oscillation of the system will be determined substantially entirely by the natural resonant frequency of the catcher resonator 53. Energy of the frequency $f_2$ may then be extracted from catcher resonator 53 by means of the coupling line 63, and is fed to a suitable load, for example, radiating antenna 64.

If switch 57 connects coupling line 59 to coupling line 58, the frequency of oscillation will be determined by the natural resonator frequency of catcher chamber 52, and will be approximately equal to $f_1$. Energy of this frequency $f_1$ may be extracted from catcher chamber 52 through the coupling line 61 and fed to a suitable load, for example, radiating antenna 62.

Although the oscillator tube 50 of Fig. 2 shows but two output chambers, it is easily seen that more could be added, the number being limited only by the electron beam efficiency. Thus, by merely adding another output resonator and providing a suitable coupling loop from this resonator to the buncher resonator, it is possible to maintain oscillations in the system having a frequency equal to the natural resonator frequency of the added output resonator. It is necessary, however, that the resonant frequencies of the various output chambers of the oscillator tube shall fall within the resonant curve of the buncher chamber, so that the buncher resonator may be excited by all of the output resonators. Of course, by making the Q of the buncher chamber low; that is, by making it sufficiently broad-band, the frequencies of the output resonators may be separated by a considerable amount. The limit of this separation, of course, is dependent upon the capability of the buncher resonator to be excited at the frequency in question.

From the above embodiments, it is seen that by the use of the present invention it is possible to provide a plurality of microwave signals using but a single discharge tube operating upon the velocity modulation principle. If the signals are required to have a high degree of frequency stability, the tube may be operated as a frequency multiplier, with a plurality of separate and independent stabilized oscillators being used to supply input signals to the tube. These signals may be separated in frequency, but must fall within the band of frequencies which will excite the low Q, broad-band buncher resonator. Each input signal has a corresponding catcher resonator tuned to some harmonic of the frequency of the signal. When any of the plurality of input signals excites the buncher resonator, the appropriate catcher resonator will in turn be excited. Microwave energy may be then removed from the excited catcher resonator. This energy has the same frequency stability as that of the oscillator used to supply the exciting input signals.

If the frequency stability requirements for the microwave signals are not so severe, the tube may be operated as a self-excited oscillator. As in the previous embodiment, the tube has a plurality of catcher resonators and a single broad-band buncher resonator. Separate feedback loops are provided for each catcher resonator with a switch for selectively connecting them to the buncher resonator. If the resonant frequency of a selected catcher resonator falls within the band of frequencies which will excite the buncher resonator, oscillations will be sustained at this frequency. By switching to a different catcher resonator, oscillations at a different frequency take place provided the same requirements are met. This permits a plurality of microwave signals to be obtained from a single tube merely by selecting a particular catcher resonator to feed energy back to the buncher resonator.

Of course, if it is desired to generate several crystal controlled microwave frequencies simultaneously, such a result may be accomplished by supplying to the buncher resonator several crystal controlled input signals simultaneously. Likewise, in the self-excited oscillator, several feedback loops may be simultaneously connected to the buncher resonator and thereby provide a self-excited microwave oscillator having several microwave frequency outputs to supply energy simultaneously.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ultra-high-frequency communication station comprising a first source of electromagnetic oscillations; a second source of electromagnetic oscillations; a discharge tube having a broad-band buncher resonator, a first catcher resonator tuned to said first source of electromagnetic oscillations, a second catcher resonator tuned to said second source of electromagnetic oscillations, and means for producing an electron stream and projecting the stream successively through said buncher and said first and second catcher resonators, said catcher resonators being located in the region in which the electrons of said electron stream attain substantially maximum bunching; means for selectively connecting said first and said second sources of electromagnetic oscillations to said buncher resonator; a transmitting antenna connected to said first catcher resonator; a receiving antenna; and a heterodyne receiver having a mixer connected to said receiving antenna and to said second catcher resonator.

2. An ultra-high-frequency communication station as in claim 1 wherein said first catcher resonator is tuned to a harmonic of said first source of electromagnetic oscillations and said second catcher resonator is tunded to a harmonic of said second source of electromagnetic oscillations.

3. An ultra-high-frequency communication station comprising an electron discharge device having means for producing an electron stream, a first cavity resonator having a pair of electron-permeable grids forming a portion of the walls thereof and positioned in the path of said stream, said first cavity resonator having a broad-band frequency characteristic, means for selectively supplying electromagnetic energy at two distinct fundamental frequencies to said first cavity resonator for exciting electromagnetic oscillations therein, said fundamental frequencies being within said broad-band characteristic, a drift tube surrounding said stream path beyond said grids, a second cavity resonator having a pair of electron-permeable grids forming a portion of the walls thereof and positioned in the path of said stream beyond said drift tube, said second cavity resonator having a narrow-band frequency characteristic, a third cavity resonator having a pair of electron-permeable grids forming a portion of the walls thereof and positioned in said stream path beyond said grids of said cavity resonator, said third cavity resonator also having a narrow-band frequency characteristic and having a resonant frequency differing from the resonant frequency of said second cavity resonator, said second and third resonators being located in the region in which the electrons of said stream attain substantially maximum bunching, the resonant frequencies of both said second and third cavity resonators being harmonically related respectively to said fundamental frequencies, a transmitting antenna, a receiving antenna, a heterodyne receiver, means in said station for coupling electromagnetic energy from said third cavity resonator to said transmitting antenna, means in said station for coupling electromagnetic energy from said second resonator to the mixer of said heterodyne receiver, and means connecting said receiving antenna to the mixer of said heterodyne receiver, whereby the discharge tube provides both the transmitting wave and the local oscillator wave for the operation of said station.

4. Frequency multiplying apparatus comprising means for producing an electron stream, a first cavity resonator having a pair of electron-permeable grids forming a portion of the walls thereof and positioned in the path of said stream, said first cavity resonator being of the broad-band type, means in said apparatus for selectively exciting electromagnetic oscillations in said first cavity resonator at a plurality of frequencies, whereby said electron stream is modulated by said electromagnetic oscillations in said first cavity resonator, a drift tube surrounding the path of said stream beyond said grids, a second cavity resonator resonant to a desired harmonic of one of said selected exciting frequencies and having a pair of electron-permeable grids forming portions of the walls thereof and positioned in the path of said stream beyond said drift tube, and a third cavity resonator resonant to a desired harmonic of another of said selected exciting frequencies and having a pair of electron-permeable grids forming portions of the walls thereof and positioned in said stream path beyond said grids of said second cavity resonator, the grids of said second and third cavity resonators being located in the region in which the electrons of said electron stream attain substantially maximum bunching.

5. An ultra-high-frequency discharge tube comprising means for producing an electron stream, a first cavity resonator having a pair of electron-permeable grids forming portions of the walls thereof and positioned in the path of said stream, said first resonator having broad-band frequency characteristics, a drift tube surrounding said electron stream path beyond said grids, a second cavity resonator having a pair of electron-permeable grids forming portions of the walls thereof and positioned in the path of said stream, said second resonator having narrow-band frequency characteristics, a third cavity resonator having a pair of electron-permeable grids forming portions of the walls thereof and positioned in said stream beyond said grids of said second cavity resonator, said third cavity resonator also having narrow-band frequency characteristics, said second and said third cavity resonators having different resonant frequencies and being located in the region in which the electrons of said stream attain substantially maximum bunching, each of which has a subharmonic within the frequency band of said first cavity resonator and means connected to said first cavity resonator for selectively introducing said subharmonic frequencies therein.

6. Ultra-high-frequency apparatus comprising an input cavity resonator circuit having broad-band frequency characteristics, a plurality of output cavity resonators having narrow-band frequency characteristics, said input cavity resonator and said plurality of output cavity resonators being in alignment, means for projecting an electron beam successively through said resonators, means for selectively exciting electromagnetic oscillations in said input resonator at a plurality of frequencies, whereby said electron stream is modulated by said electromagnetic oscillations in said input resonator, and means for extracting electromagnetic energy from each of said output resonators, said output resonators being located in the region in which the electrons of said electron beam attain substantially maximum bunching and being tuned to different frequencies, each frequency being a harmonic of one of the said exciting means frequencies.

7. An ultra-high-frequency communication station comprising a first source of electromagnetic oscillations, a second source of electromagnetic oscillations, a discharge tube having a broad-band buncher resonator and a pair of catcher resonators and means for projecting a stream of electrons successively through said buncher and catcher resonators, said catcher resonators being located in the region in which the electrons of said stream attain substantially maximum bunching, a switching means connecting said first and said second oscillation sources to said buncher resonator, a transmitting antenna connected to first of said catcher resonators, a receiving antenna, and a heterodyne receiver having a mixer connected to said receiving antenna and said second catcher resonator.

8. In combination; a discharge tube having a broad-band buncher resonator, a first catcher resonator tuned to a harmonic of a first frequency within the frequency response of said buncher resonator, a second catcher resonator tuned to a harmonic of a second frequency within the frequency response of said buncher resonator, and means for producing an electron stream and projecting the stream successively through said buncher and catcher resonators, said catcher resonators being located in the region in which the electrons of said stream attain substantially maximum bunching; means for selectively exciting said buncher resonator with electromagnetic energy oscillating at said first or said second frequency and load means coupled to said first and second catcher resonators.

9. A discharge tube comprising a broad-band buncher resonator, a first catcher resonator tuned to a harmonic of a first frequency within the frequency response of said buncher resonator, a second catcher resonator tuned to a harmonic of a second frequency within the frequency response of said buncher resonator, and means for producing an electron stream and projecting the stream successively through said buncher and catcher resonators, said catcher resonators being located in the region in which the electrons of said stream attain substantially maximum bunching.

10. Ultra-high-frequency apparatus comprising means for producing an electron stream, a first cavity resonator having a pair of electron-permeable grids forming a portion of the walls thereof and positioned in the path of said stream, said first cavity resonator being a buncher resonator of the broad-band type, means for supplying electromagnetic energy to said first cavity resonator for exciting electromagnetic oscillations therein, a drift tube surrounding the path of said stream beyond said grids, a second cavity resonator having a pair of electron-permeable grids forming a portion of the walls thereof positioned in the path of said stream beyond said drift tube, said second cavity resonator being a catcher resonator of the sharply-tuned type tuned to a harmonic of a first frequency within the frequency response of said buncher resonator, a third cavity resonator having a pair of electron-permeable grids forming a portion of the walls thereof and positioned in said stream path beyond the grids of said second cavity resonator, said third cavity resonator being a catcher resonator of the sharply-tuned type tuned to a harmonic of a second frequency within the frequency response of said buncher resonator, means for projecting said electron stream successively through said buncher and catcher resonators, said second and third resonators being located in the region in which the electrons of said stream attain substantially maximum bunching, means for extracting electromagnetic energy from said second cavity resonator, means for extracting electromagnetic energy from said third cavity resonator, means for selectively connecting one of said energy extracting means to said energy supplying means, and load means coupled to said catcher resonators.

11. An ultra-high-frequency discharge tube comprising means for producing an electron stream, a first cavity resonator having a pair of electron-permeable grids forming portions of the walls thereof and positioned in the path of said stream, said first resonator being a buncher resonator having broad-band frequency characteristics, a drift tube surrounding said electron stream path beyond said grids, a second cavity resonator having a pair of electron-permeable grids forming portions of the walls thereof and positioned in the path of said stream beyond said drift tube, said second resonator being a catcher resonator having narrow-band frequency characteristics and being tuned to a first frequency within the frequency response of said buncher resonator, a third cavity resonator having a pair of electron-permeable grids forming portions of the walls thereof and positioned in the path of said stream beyond the grids of said second cavity resonator, said third cavity resonator being a catcher resonator also having narrow-band frequency characteristics and being tuned to a harmonic of a second frequency within the frequency response of said buncher resonator, means for projecting said electron stream successively through said buncher and catcher resonators, said catcher resonators being located in the region in which the electrons of said stream attain substantially maximum bunching, means coupled to said tube for selectively coupling ultra-high-frequency energy from said second and third resonators to said first resonator, and load means coupled to said catcher resonators.

12. Ultra-high-frequency apparatus comprising a buncher cavity resonator circuit having broad-band frequency characteristics, a plurality of catcher cavity resonators having narrow-band frequency characteristics, said catcher resonators being tuned to different frequencies and the resonant frequency of each catcher resonator being a harmonic of a frequency within the frequency response of said buncher resonator, said buncher cavity resonator and said catcher cavity resonators being in alignment, means for producing an electron stream and projecting the stream successively through said buncher and catcher resonators, means for introducing electromagnetic energy to said buncher resonator for exciting electromagnetic oscillations therein, whereby said electron stream is modulated by said oscillations, said catcher resonators being located in the region in which the electrons of said stream attain substantially maximum bunching, means for extracting electromagnetic energy from each of said catcher resonators, means for selectively connecting said energy-extracting means to said energy-introducing means, and load means coupled to said catcher resonators.

13. In combination; a discharge tube having a broad-band buncher resonator, a first catcher resonator tuned to a harmonic of a first frequency within the frequency response of said buncher resonator, a second catcher resonator tuned to a harmonic of a second frequency within the frequency response of said buncher resonator, and means for producing an electron stream and projecting the stream successively through said buncher and catcher resonators, said catcher resonators being located in the region in which electrons of said stream attain substantially maximum bunching; and means for selectively exciting said buncher resonator with electromagnetic energy oscillating at said first or said second frequency.

ELLIOTT LEVINTHAL.

REFERENCES CITED

The following references are of record in the file of this patent:

UNITED STATES PATENTS

| Number | Name | Date |
|---|---|---|
| 2,222,901 | Hahn | Nov. 26, 1940 |
| 2,280,824 | Hansen et al. | Apr. 28, 1942 |
| 2,281,935 | Hansen et al. | May 5, 1942 |
| 2,305,883 | Litton | Dec. 22, 1942 |
| 2,372,193 | Fisk | Mar. 27, 1945 |
| 2,406,370 | Hansen et al. | Aug. 27, 1946 |
| 2,412,935 | Tashjian | Dec. 17, 1946 |
| 2,414,843 | Varian et al. | Jan. 28, 1947 |
| 2,452,566 | Hansen et al. | Nov. 2, 1948 |